United States Patent [19]

Rameil

[11] 3,835,838

[45] Sept. 17, 1974

[54] APPARATUS FOR DETECTING CARDIOVASCULAR DISEASES

[75] Inventor: Jean Rameil, Paris, France

[73] Assignee: International Contacts Inventors Anstalt, Vaduz, Liechtenstein

[22] Filed: Oct. 12, 1972

[21] Appl. No.: 296,866

[30] Foreign Application Priority Data
Oct. 12, 1971  Belgium .......................... 773808
Oct. 4, 1972   Belgium .......................... 122724

[52] U.S. Cl. .......................................... 128/2.05 P
[51] Int. Cl. ............................................. A61b 5/02
[58] Field of Search.. 128/2.05 A, 2.05 GF, 2.05 M, 128/2.05 P, 2.05 QR, 2.05 S, 2.05 T, 2.06 E, 2.06 R, 2 LN, 2 R, 2 S; 33/174 D; 356/39–41; 273/1 E; 221/199, 282, 286; 73/379, 402

[56] References Cited
UNITED STATES PATENTS

| | | | |
|---|---|---|---|
| 1,983,534 | 12/1934 | Buckley | 128/2.05 P |
| 2,095,268 | 10/1937 | Roberts | 128/2 S |
| 3,139,086 | 6/1964 | Batsch et al. | 128/2.05 P |
| 3,230,950 | 1/1966 | Buffington | 128/2.05 R |
| 3,463,142 | 8/1969 | Harte | 128/2 L |
| 3,491,750 | 1/1970 | King | 128/2.06 R |
| 3,541,590 | 11/1970 | Settler et al. | 128/2.05 P |

Primary Examiner—William E. Kamm
Attorney, Agent, or Firm—Steinberg & Blake

[57] ABSTRACT

Apparatus for public use adapted to detect cardiovascular diseases by checking the heart pulsations and comprising a sensitive plate arranged on the front side of the apparatus and having marks for positioning the fingers of the user on said plate in combination with means for detecting and transducing the blood pulsations in the arteries of the finger tips of the user, means for amplifying electric signals delivered by said transducing means and means connected to the output of said amplifying means for sound, visual and/or graphical display of said amplified signals.

10 Claims, 3 Drawing Figures

3,835,838

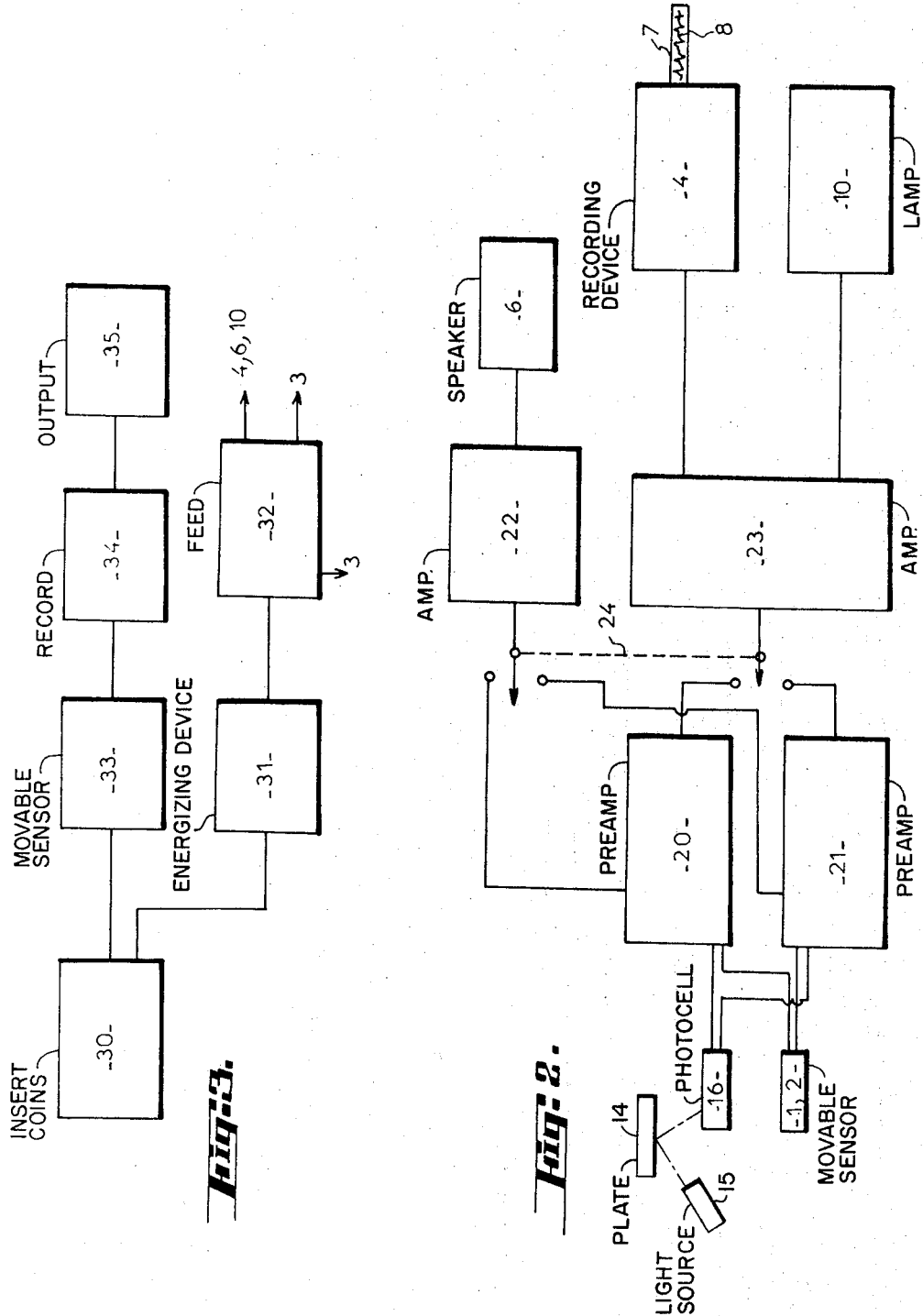

APPARATUS FOR DETECTING CARDIOVASCULAR DISEASES

The present invention relates essentially to an apparatus for detecting, tracking or tracing cardiovascular diseases by checking the heart beats or pulsations, this apparatus being adapted to be used by the public or by unskilled persons and enabling to obtain in a simple and economic manner an electrocardiogram from the record of heart pulsations sensed at various points of the body.

It is known that the audio-analysis of the heart pulsations by a specialist is an important part of the auscultation and it provides very worthy information prior to a quantified analysis which is provided by an electrocardiogram carried out in a laboratory. As a matter of fact the electric impulse that feeds or innervates the heart muscle is correlated with the pressures exercised by the latter and which originate from the vibrations perceived or from the pressures recorded during auscultation. According to great specialists, the detection of alterations is based for a major part upon the recollection of previous examinations so that an uninitiated person who is attentive to his own exclusive case may effectively take part in such an observation.

The simple data of arrhythmia, bradycardia, tachycardia, insufficient pulse set off are easily controlable by recording the pulsations detected in the mesocardiac area and may enable the uninitiated person to control and follow up the satisfactory working of his heart muscle. Moreover if he cannot translate the accurate meaning of the modifications occuring from one day to the other or existing with respect to a typical normal case, he may still be surprised by such anomalies which are known as exhibiting a large number of variants according to the biological failures causing same. The uninitiated person thus advised of these abnormalities will therefore be able to take medical advice without delay from a specialist.

For this purpose the invention proposes an apparatus for detecting cardiovascular diseases by checking the heart pulsations, of the kind adapted for public use and which is characterized in that it comprises a sensitive plate arranged on the front side of the apparatus and comprising marks for positioning the fingers of the user on said plate in combination with means for detecting and transducing the blood pulsations within the arteries at the finger tips of the user, means for amplifying the electric signals delivered by said transducing means and means connected to the output of said amplifying means for sound, visual and/or graphical reproduction or display of said amplified signals.

One of the signific advantages of this apparatus is that its operation is particularly simple and fully automatic so that it is accessible to the general public and that it enables to very quickly obtain a graphical record of the heart beats or pulsations forming an electrocardiogram advising immediately the user of the good or bad operation of his heart muscle.

According to a further characterizing feature of the invention, said sensitive plate comprises a plate of transparent glass or like material and said detection and transducing means comprise at least one light source located below said plate and sending a light beam towards the location of the finger tip of the user placed in a desired position on said plate and at least one photoelectric cell located underneath said plate and receiving or collecting the reflected light beam.

The device used by the present invention for detecting and transducing the heart pulsations therefore is particularly simple and reliable and secures a perfectly correct operation for a very long time by means of an equipment the cost price of which is low.

According to still another characterizing feature of the invention, said detecting and transducing means also comprise a sensor such as a magnetic or piezoelectric sensor connected by an extensible cord, string, wire or thread to said amplifying means and adapted to be laid on the breast or chest of the user or on any other suitable point of the body.

Therefore the user may thus directly check at several points of his body the heart pulsations or beats and possibly take notice of the differences found with respect to corresponding normal typical diagrams. Such a way of proceeding may for example contribute to detect an inflammatory disorder of an artery known under the name arteritis and its evolution.

According to still further characterizing features of the invention, the apparatus comprises a coin-operated device causing the apparatus to be put in operation when coins have been inserted into the device and a timing device stopping the operation of the apparatus after a given time period.

Another advantage of the apparatus according to the invention is therefore that it may be made available to the public and any person who wishes to get a reocrd of his blood pulsations at any point of the body is able to perform same for a moderate price in a place accessible to the public.

Moreover the simplicity and rugness of the apparatus according to the invention enable same to be located in any public place without incurring any damage.

Further characteristics and advantages of the invention will appear more clearly when reading the following explanatory description with reference to the accompanying diagrammatic drawings given by way of example only illustrating a form of embodiment of the invention and wherein:

FIG. 2 is a diagram showing the arrangement of the various elements of the apparatus according to the invention; and FIG. 3 diagrammatically shows the operation of the apparatus, the various operating steps being depicted in block form.

Figure 1:
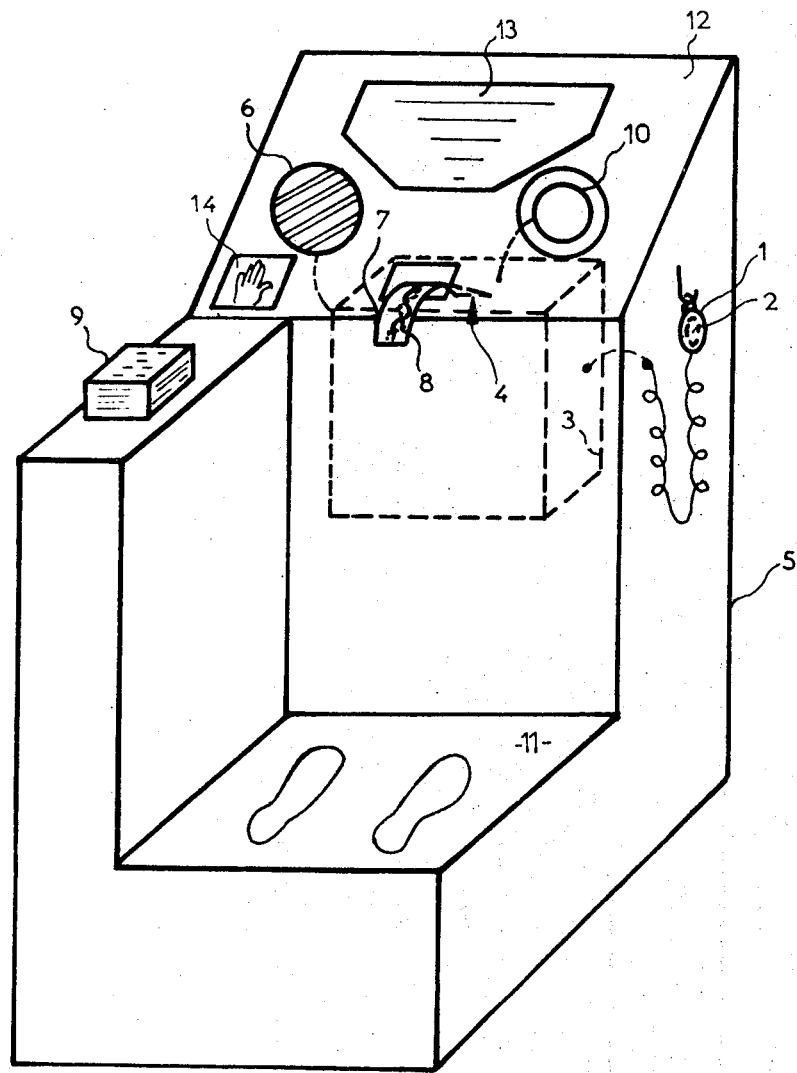
FIG. 1 is a perspective view of an apparatus for detecting cardiovascular diseases according to the invention.

In FIG. 1 has thus been shown an outside view of the apparatus which comprises the heart pulsation detector 1, the associated transducer 2 such as a magnetic or piezo-electric sensor for signals of a frequency lower than 100 Hz, means 3 for amplifying the electric signals from the transducer 2, a graphic recording device 4 delivering a tape 7 comprising diagrams 8 representative of the heart pulsations of the user, a loud-speaker 6 connected to the amplifying means 3 and playing back or reproducing the pulsations in sound form, a means for visually displaying or reproducing said pulsations, such as for instance a blinking lamp 10 and a distributor 9 for booklets showing and illustrating typical normal diagrams to be compared with the graphic recording of the pulsations of the user.

All of these elements or members are enclosed within a strong frame 5 which comprises a stage 11 for the user to go thereon and a sloping desk or face 12 in front of which the user is placed when he is on the stage 11 and which comprises the output of the graphic recording device 4, the loud-speaker 6 and the lamp 10. This inclined front plate 12 also comprises a plate member 13 giving detailed directions for use of the apparatus as well as a sensitive plate 14 which has been shown diagrammatically below the loud-speaker 6. This plate 14 desirably comprises means or marks for positioning the fingers or the hand of the user, and these means or marks may be a sketch or outline of the hand or fingers on the outside face of this plate 14 or the positions of the fingers may be impressed as a hollow or sunk impression into said plate.

According to the invention, this plate 14 is a plate made from transparent glass or like material and it enables to detect the blood pulsation within the arteries of the finger tips of the user with the assistance of means which will be described hereinafter more in detail with reference to FIG. 2.

In this Figure the various elements of the apparatus for detecting cardiovascular diseases according to the invention are effectively shown diagrammatically. The pulsation detector 1 and the associated transducer 2 forming a movable assembly such as a sensor connected by a wire or thread or by a cord or string to the apparatus are connected to a pair of preamplifiers 20 and 21 mounted in parallel relationship. In parallel with said movable detecting and transducing means 1, 2 is a device 16 comprising at least one photo-electric cell and which is connected to these preamplifiers 20 and 21. This photo-electric cell is associated with a light source 15 located under said plate 14 and which sends a light beam towards at least the finger tip of the user. The strength of the light beam reflected towards the photoelectric cell varies according to the blood beats or pulsations within the artery of the finger tip and these variations of the reflected light intensity are in a characteristic manner representative of the heart pulsations of the user.

The output of each one of the preamplifiers 20, 21 is connected to a pair of amplifiers 22, 23 mounted in parallel relationship through the medium of a double throw switch 24 connecting either the preamplifier 20 or the preamplifier 21 to the amplifiers 22 and 23. The aforesaid loud-speaker 6 is mounted at the output of the amplifier 22 whereas the graphic recording device 4 and the blinking lamp 10 are mounted on both outputs of the amplifier 23.

It is apparent that only those elements have been shown which are essential to the description of the apparatus according to the invention but that the latter may comprise all the improvements in particular electronic circuits which are within the purview of those skilled in the art to increase the accuracy of the indications delivered to the user.

This apparatus according to the invention which is desirably adapted to be located at a place where the public is passing may comprise a coin-operated device enabling to cause the apparatus to be put on or in operation that is feeding with power the various detecting, transducing, amplifying and displaying or reproducing devices for the heart pulsations as well as a timing device stopping the operation of the apparatus for instance by cutting off the power supply to its elements after a given time period corresponding to the recording of a complete graphic plot.

The operation of the apparatus provided with this coinoperated device has been shown in bloc form in FIG. 3.

In this Figure, the block 30 corresponds to the insertion of coins into a suitable device. When this device has recorded or accounted for the required sum of money, it releases or triggers the energizing 31 and feeding 32 of the amplifying devices 3 and reproducing or displaying devices 4, 6, 10. The use of the apparatus is also shown in blockform, the block 33 illustrating the use of the movable device 1, 2 or of the device 16 associated with the sensitive plate 14, the block 34 illustrating the graphic recording, the hearing or visual display of the results and the block 35 illustrating the output of the results.

It is also obvious that various modifications may be made to the various means for reproducing or displaying the heart beats or pulsations, such as the loud-speaker, the graphic recording device and the visual display device and that they may be substituted for by and used in combination with any other similar device such as for instance a screen of a cathode ray oscilloscope or means for recording on a tape or disk.

The invention is therefore not at all limited to the form of embodiment described and shown which has been given by way of example only. In particular it comprises all the means forming technical equivalents to the means described as well as their combinations if same are carried out according to the gist of the invention and used within the scope of the appended claims.

What is claimed is:

1. An apparatus for detecting cardiovascular diseases by checking the heart pulsations, adapted for public use and comprising transducing means constituted by:

a transparent glass-like plate positioned on the front face of said apparatus and comprising markings for positioning the hand of the user,
   at least one light source positioned below said plate and emitting at least a light beam towards the location of the hand of the user positioned on said markings of said plate,
   at least one photo-electric cell located under said plate and responsive to light received through hand tissues and said plate and reflected to said cell,
   amplifying means electrically connected to said cell for amplifying electric signals delivered by said transducing means, and indicator means connected to said amplifying means for reproducing and displaying the amplified signals.

2. An apparatus according to claim 1 and comprising second transducing means including a sensor electrically connected to said amplifying means and adapted to be laid by the user on a suitable place of his body.

3. An apparatus according to claim 2, wherein said amplifying means comprise a first preamplifier connected to at least said photoelectric cell, a second preamplifier connected to at least said sensor, at least a pair of amplifying circuits having inputs connected to the preamplifiers through switching means and outputs connected to said indicator means.

4. An apparatus according to claim 1, wherein said indicator means comprise a graphic recording means.

5. An apparatus according to claim 1, wherein said indicator means comprise a blinking lamp.

6. An apparatus according to claim 1, wherein indicator means comprise a loud-speaker.

7. An apparatus according to claim 1, further comprising a coin-operated means causing the apparatus to be put in operation for a predetermined time period when coins are inserted into said means.

8. An apparatus according to claim 1, wherein said indicator means comprise means for delivering a paper tape comprising graphic diagrams representing records of heart pulsations.

9. An apparatus according to claim 3, wherein said indicator means includes a graphic recording means, a blinking lamp, a loud-speaker, and means for delivering a paper tape comprising graphic diagrams representing records of heart pulsations.

10. An apparatus according to claim 9, further comprising a coin-operated means causing the apparatus to be put in operation for a predetermined time period when coins are inserted into said means.

* * * * *